United States Patent [19]

Willkens et al.

[11] Patent Number: 5,514,630
[45] Date of Patent: May 7, 1996

[54] COMPOSITION FOR SMALL CERAMIC IGNITERS

[75] Inventors: Craig A. Willkens, Sterling; Linda S. Bateman, Spencer, both of Mass.

[73] Assignee: Saint Gobain/Norton Industrial Ceramics Corp., Worchester, Mass.

[21] Appl. No.: 319,211

[22] Filed: Oct. 6, 1994

[51] Int. Cl.$^6$ .................................................. C04B 35/58
[52] U.S. Cl. .............................. 501/89; 501/91; 501/92; 501/93; 501/96; 252/516
[58] Field of Search .......................... 501/87, 89, 92, 501/93, 98, 91, 96; 252/516, 518

[56] References Cited

U.S. PATENT DOCUMENTS

| | | | |
|---|---|---|---|
| 4,125,756 | 11/1978 | Hierholzer, Jr. et al. | 219/121 |
| 4,626,516 | 12/1986 | Morelock | 501/92 |
| 5,045,237 | 9/1991 | Washburn | 501/92 |
| 5,085,804 | 2/1992 | Washburn | 252/516 |
| 5,191,508 | 3/1993 | Axelson et al. | 361/257 |
| 5,292,691 | 3/1994 | Hecht et al. | 501/89 |
| 5,292,692 | 3/1994 | Maloney et al. | 501/89 |

FOREIGN PATENT DOCUMENTS 0180928  5/1986  European Pat. Off. ................. 501/92

*Primary Examiner*—Paul Marcantoni
*Attorney, Agent, or Firm*—Thomas M. DiMauro

[57] ABSTRACT

A ceramic material comprising:
(a) between about 50 and about 80 v/o of an electrically insulating ceramic having a resistivity of at least about 10 E+10 ohm-cm;
(b) between about 10 and about 45 v/o of a semiconductive material having a resistivity of between about 1 and about 10 E+8 ohm-cm;
(c) between about 5 and about 25 v/o of a metallic conductor having a resistivity of less than about 10 E-2 ohm-cm; and
(d) between about 0.5 and about 20 v/o of a resistivity-enhancing compound selected from the group consisting of metallic oxides, metallic oxynitrides, rare earth oxides, rare earth oxynitrides, and mixtures thereof.

15 Claims, 1 Drawing Sheet

COMPOSITION FOR SMALL CERAMIC IGNITERS

BACKGROUND OF THE INVENTION

Ceramic materials have enjoyed great success as igniters in gas fired furnaces, stoves and clothes dryers. Ceramic igniter production requires constructing an electrical circuit through a ceramic component, a portion of which is highly resistive and rises in temperature when electrified by a wire lead. One conventional igniter, the Mini-Igniter™, available from the Norton Company of Milford, N.H., is designed for 8 volt though 48 volt applications and has a composition comprising aluminum nitride ("AlN"), molybdenum disilicide ("$MoSi_2$"), and silicon carbide ("SiC"). As the attractiveness of the Mini-Igniter™ has grown, so has the number of applications requiring small igniters with rated voltages exceeding the conventional 24 volts. However, when used in such applications, the 24 V Mini-Igniter™ is subject to temperature runaway and so requires a transformer in the control system to step down from conventional line voltage (i.e., 120 volts). Accordingly, there is a need for small, higher voltage igniters designed for either 120 or 230 line voltage applications which do not require an expensive transformer but still possess the following requirements set by the appliance and heating industries to anticipate variation in line voltage:

| | |
|---|---|
| Time to design temperature | <5 sec |
| Minimum temperature at 85% of design voltage | 1100° C. |
| Design temperature at 100% of design voltage | 1350° C. |
| Maximum temperature at 110% of design voltage | 1500° C. |
| Hot-zone Length | <1.2–1.5" |
| Power | 65–100 W. |

Because the amperage used for these high voltage applications will likely be comparable to that used in 24 volt applications (i.e., about 1.0 amp), the increased voltage will likely be realized by increasing the resistance of the igniter.

The resistance of any body is generally governed by the equation $$Rs = Ry \times L/A,$$

wherein

Rs=Resistance;

Ry=Resistivity;

L=the length of the conductor; and

A=the cross-sectional area of the conductor.

Because the single leg length of conventional 12 V and 24 V igniters is already about 1.2 inches, it can not be increased significantly without reducing its commercial attractiveness. Similarly, the cross-sectional area of the smaller igniter, between about 0.0010 and 0.0025 square inches, will probably not be decreased for manufacturing reasons. Therefore, it appears that the desired increase in the resistance of the small, high voltage igniters will be realized by increasing its resistivity.

Because the Mini-Igniter™ is comprised of one highly resistive material (AlN), one moderately resistive material (SiC), and one highly conductive material ($MoSi_2$), one obvious avenue for increasing the igniter's resistivity is to reduce its $MoSi_2$ and SiC contents while adding AlN. However, one trial composition (containing about 76 volume percent ("v/o" or "vol %") AlN, 9 v/o $MoSi_2$, and 15 v/o SiC) was found to be unsatisfactory in that it not only was slow to reach the design temperature (due to low $MoSi_2$ levels), it also possessed a significant negative temperature coefficient of resistivity ("NTCR") and so was subject to temperature runaway above about only 1350° C. A NTCR means that as the temperature of the igniter increases, its resistance decreases. This decrease makes the igniter hotter than it would be if the resistance was constant. If the NTCR is too extreme, the igniter is slow and cool at 85% and unstable at 110% of the rated voltage. Indeed, such an igniter may exhibit runaway at less than the 110% rating, in which case the amperage and temperature continue to rise even at a constant voltage until failure (burnout) occurs. Rather, it is preferable for the igniters to possess a positive temperature coefficient of resistance ("PTCR") or a moderate NTCR. Whereas a ceramic having a PTCR increases in resistivity when its temperature is increased from 1000° C. to 1400° C., a ceramic having a moderate NTCR decreases in resistivity by less than 25% when its temperature is increased from 1000° C. to 1400° C. Either a PTCR or a moderate NTCR would allow for a more gradual temperature increase with increasing voltage, which is critical for 120 V applications because, as explained above, the igniter must operate stably over a broad range of voltage.

U.S. Pat. No. 5,405,237 ("the Washburn patent") discloses compositions suitable for the hot zone of a ceramic igniter comprising:

(a) between 5 and 50 v/o $MoSi_2$, and (b) between 50 and 95 v/o of a material selected from the group consisting of silicon carbide, silicon nitride, aluminum nitride, boron nitride, aluminum oxide, magnesium aluminate, silicon aluminum oxynitride, and mixtures thereof. However, each example disclosed in the Washburn patent (and companion U.S. Pat. No. 5,085,804) uses only a) AlN or $Si_3N_4$, b) $MoSi_2$ and c) SiC (with some examples also adding $MgCO_3$). As discussed above, it is believed these systems are not readily conducive to producing commercially viable ceramic igniters which are stable at high voltages. Although the Washburn patent does disclose a 220 V igniter made from 50 v/o AlN, 42.2 v/o SiC and 7.8 v/o $MoSi_2$, the low $MoSi_2$ level in this igniter dramatically constrains the speed with which this igniter reaches its design temperature.

Accordingly, it is the object of the present invention to find a highly resistive mini-igniter composition which does not experience temperature runaway at high temperatures and meets the above-discussed time and temperature constraints of high voltage applications.

SUMMARY OF THE PRESENT INVENTION

In accordance with the present invention, there is provided a ceramic igniter having a hot zone composition comprising:

(a) between about 50 and about 80 v/o of an electrically insulating ceramic having a resistivity of at least about $10^{10}$ ohm-cm;

(b) between about 10 and about 45 v/o of a semiconductive material having a resistivity of between about 1 and about $10^8$ ohm-cm;

(c) between about 5 and about 25 v/o of a metallic conductor having a resistivity of less than about $10^{-2}$ ohm-cm; and (d) between about 0.5 and about 20 v/o of a resistivity-enhancing compound selected from the group consisting of metallic oxides, metallic oxynitrides, rare earth oxides, rare earth oxynitrides, and mixtures thereof

DETAILED DESCRIPTION OF THE INVENTION

Figure 1:
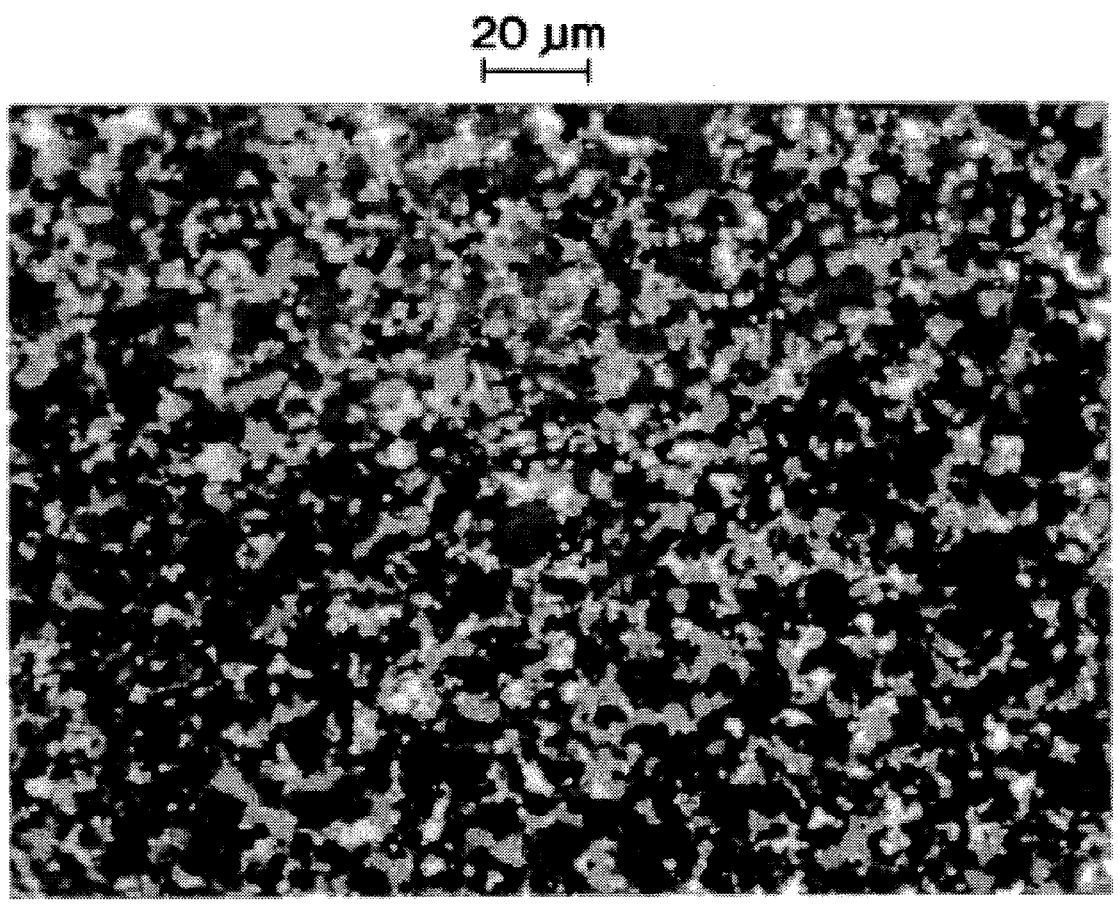
FIG. 1 presents a typical microstructure of the present invention wherein the AlN is gray, the SiC is light gray, the $MoSi_2$ is white, and (it is believed) the alumina/aluminum oxynitride mixture is dark gray.

It has been unexpectedly discovered that adding alumina, aluminum oxynitride or mixtures thereof to the hot zone of a conventional $AlN$—$MoSi_2$—$SiC$ system will increase the resistivity of the igniter more than the comparable fraction of AlN, thus allowing the use of higher $MoSi_2$ fractions while providing the resistivity needed for the higher voltage applications. The freedom to use high $MoSi_2$ levels results in a more speedy time to temperature and, in some cases, a less drastic rise in temperature with increasing voltage between 85% and 110% of the rated voltage. Accordingly, the igniter of the present invention possesses both the upper resistivity required for high voltage applications and the quick time to temperature required by the heating and appliance industries.

In some embodiments of the present invention, the resistivity-enhancing compound is a mixture of alumina and aluminum oxynitride. This mixture may be produced merely by adding alumina to the green body. In such cases, it is believed that, during sintering, at least some of the alumina reacts with a portion of the aluminum nitride to form a crystalline aluminum oxynitride phase. The presence of the aluminum oxynitride phase in the ceramic has been confirmed by x-ray diffraction analysis. Dissolution of impurities into this crystalline phase is believed to increase the refractoriness of the intergranular phase, resulting in a decrease in ionic conductivity through the intergranular phase with increasing temperature. In addition, the alumina addition is believed to act as a sintering aid which increases grain growth, resulting in a portion of the conductive phase being isolated, thus increasing the resistivity.

When alumina is added to the green body, any conventional alumina powder may be selected. It is generally present in the green body in an amount between about 0.5 and 20 v/o, preferably between about 2 and 8 v/o, more preferably about 4–5 v/o. Typically, alumina powder having an average grain size of between about 0.1 and about 10 microns, and only about 0.2 w/o impurities, is used. Preferably, the alumina has a grain size of between about 0.3 and about 10 um. More preferably, Alcoa A17 calcined alumina, available from Alcoa Industrial Chemicals of Bauxite, Ark., is used. Additionally, alumina may be introduced in forms other than a powder, including, but not limited to, alumina sol-gel approaches and hydrolysis of a portion of the aluminum nitride.

Although Examples I–III set out below each add only alumina to the conventional $AlN$—$MoSi_2$—$SiC$ system, it is contemplated that compounds such other metallic oxides, metallic oxynitrides, rare earth oxides (e.g., 5 v/o yttria), rare earth oxynitrides, and mixtures thereof, may be substituted for alumina in the green body of the present invention and desirable results would still be obtained.

In general, the hot zone composition should include (a) between about 50 and about 80 v/o of an electrically insulating ceramic having a resistivity of at least about $10^{10}$ ohm-cm; (b) between about 10 and about 45 v/o of a semiconductive material having a resistivity of between about 1 and $10^8$ ohm-cm; (c) between about 5 and about 25 v/o of a metallic conductor having a resistivity of less than about $10^{-2}$ ohm-cm; and (d) between about 0.5 and about 20 v/o of a resistivity-enhancing compound selected from the group consisting of metallic oxides, metallic oxynitrides, rare earth oxides, rare earth oxynitrides, and mixtures thereof. Preferably, the hot zone comprises 50–60 v/o electrically insulating ceramic, 20–30 v/o of the semiconducting ceramic, 6–12 v/o of the conductive material, and 2–8 v/o of the resistivity-enhancing compound.

For the purposes of the present invention, an electrically insulating ceramic (or "insulator") is a ceramic having a room temperature resistivity of at least about $10^{10}$ ohm-cm. If the electrically insulating ceramic component is present as more than about 70 v/o of the hot zone composition, the resulting composition becomes too resistive and is insufficiently slow in achieving target temperatures at high voltages. Conversely, if it is present as less than about 50 v/o (when the conductive ceramic is present at about 6 v/o), the resulting ceramic becomes too conductive at high voltages. Clearly, when the conductive ceramic fraction is raised above 6 v/o, the hot zone is more conductive and the upper and lower bounds of the insulating fraction can be suitably raised to achieve the required voltage. Typically, the insulator is a nitride selected from the group consisting of aluminum nitride, silicon nitride and boron nitride.

For the purposes of the present invention, a semiconductive ceramic (or "semiconductor") is a ceramic having a room temperature resistivity of between about 1 and $10^8$ ohm-cm. If the semiconductive component is present as more than about 45 v/o of the hot zone composition (when the conductive ceramic is in the range of about 6–10 v/o), the resultant composition becomes too conductive for high voltage applications (due to lack of insulator). Conversely, if it is present as less than about 10 v/o (when the conductive ceramic is in the range of about 6–10 v/o), the resultant composition becomes too resistive (due to too much insulator). Again, at higher levels of conductor, more resistive mixes of the insulator and semiconductor fractions are needed to achieve the desired voltage. Typically, the semiconductor is a carbide selected from the group consisting of silicon carbide (doped and undoped), and boron carbide.

For the purposes of the present invention, a conductive material is one which has a room temperature resistivity of less than about $10^{-2}$ ohm-cm. If the conductive component is present in an amount of more than about 25 v/o of the hot zone composition, the resultant ceramic becomes too conductive for high voltage applications, resulting in a unacceptably hot igniter. Conversely, if it is present as less than about 6 v/o, the resultant ceramic becomes too resistive for high voltage applications, resulting in an unacceptably cold igniter. Typically, the conductor is selected from the group consisting of molybdenum disilicide, tungsten disilicide, and nitrides such as titanium nitride, and carbides such as titanium carbide.

If the resistivity-enhancing compound is present in an amount of less than about 0.5 v/o of the hot zone composition, then its resistivity-enhancing effect is not significant. Conversely, if it is present in an amount of more than about 20 v/o, then the hot zone becomes too resistive for a speedy time to temperature in high voltage applications. Preferably, it comprises between about 2–v/o of the hot zone composition, more preferably about 4 v/o. Typically, it is selected from the group consisting of metallic oxides, metallic oxynitrides, rare earth oxides, and rare earth oxynitrides. Preferably, it is selected from the group consisting of aluminum oxynitride and alumina.

Preferably, the component fractions of aluminum nitride, molybdenum disilicide and silicon carbide disclosed in U.S.

Pat. No. 5,045,237 ("the Washburn patent"), the specification of which is wholly incorporated by reference herein, are used to construct the hot zone of the igniter of the present invention. It has been found that the AlN—SiC—MoSi$_2$ system is a flexible one which can produce igniters having resistivities ranging from about 0.001 to about 100 ohm-cm. Preferably, the particle sizes of both the starting powders and the grains in the sintered ceramic are similar to those described in the Washburn patent.

The hot zone/cold zone igniter design as described in the Washburn patent may be suitably used in accordance with the present invention. The hot-zone provides the functional heating for gas ignition. It generally has a resistivity of at least about 0.04 ohm-cm, preferably at least about 0.2 ohm-cm in the temperature range of 1000° to 1600° C. Preferably, it comprises about 50 to 70 v/o aluminum nitride, and about 5–25 v/o MoSi$_2$ and 10–45 v/o SiC (in a volume ratio of about 1 part MoSi$_2$ to about 2 parts SiC), and about 0.5 to 20 v/o of the resistivity enhancing compound. More preferably, it comprises about 50 to 60 v/o aluminum nitride, and about 6–12 v/o MoSi$_2$, 20–30 v/o SiC (typically in a volume ratio of about 1 part MoSi$_2$ to about 2 parts SiC), and about 2–8v/o of the resistivity enhancing compound. In one especially preferred embodiment, the hot zone comprises about 60 v/o AlN, 11 v/o MoSi$_2$, and 25 v/o SiC and 4 v/o aluminum oxynitride/alumina mixture.

In preferred embodiments the average grain size ($d_{50}$) of the hot zone components in the densified body is as follows:

a) insulator (i.e., AlN): between about 2 and 10 microns;

b) semiconductor (i.e., SiC): between about 1 and 10 microns;

c) conductor (i.e., MoSi$_2$): between about 1 and 10 microns; and d) resistivity enhancing compound (ie, alumina/aluminum oxynitride mixture): between about 2 and 10 microns.

FIG. 1 discloses a microstructure of the present invention.

The cold-zone allows for attachment of the wire leads. Preferably, it also is comprised of AlN, SiC and MoSi$_2$. However, it has a significantly higher percentage of the conductive and semiconductive materials (i.e., SiC and MoSi$_2$) than does the hot zone. Accordingly, it has typically only about 1/5 to 1/20 of the resistivity of the hot-zone composition and does not rise in temperature to the levels experienced by the hot zone. It preferably comprises about 20 to 65 v/o aluminum nitride, and about 20 to 70 v/o MoSi$_2$ and SiC in a volume ratio of from about 1:1 to about 1:3. More preferably, the cold zone comprises about 60 v/o AlN, 20 v/o SiC and 20 v/o MoSi$_2$. Because it does not require a high resistivity, the cold zone need not contain the aluminum oxynitride phase required by the hot zone of the present invention.

It has been found that the dimensions of the igniter affect its properties and performance. In general, the single leg length of the hot zone should be greater than about 0.700 inches (to provide enough mass so that cooling convective gas flow will not significantly affect its temperature) but less than about 1.500 inches (to provide sufficient mechanical ruggedness). Its width should be greater than about 0.04 inches to provide sufficient strength and ease of manufacture. Similarly, its thickness should be more than about 0.03 inches to provide sufficient strength and ease of manufacture. Preferably, the igniters of the present invention are typically between about 1.25 and about 2.00 inches in total single leg length, have a hot zone cross-section of between about 0.001 and about 0.005 square inches(more preferably, less than about 0.0025 square inches), and are of a two-legged hairpin design. In certain embodiments designed for 120 V applications, the hot zone is about 1.25 inches in single leg length, about 0.03 inches in thickness, and about 0.047 inches in width (i.e., a cross section of about 0.00141 square inches). It has also been found that alteration of these dimensions can produce igniters of the present invention possessing differently rated voltages. In particular, Table I sets forth the dimensions of the hot zone of the igniter required for voltages using a hot zone composition of about 60 a/o AlN, about 11 v/o SiC, and about 25 v/o MoSi$_2$, and about 4 v/o aluminum oxynitride/alumina mixture:

TABLE I

| Voltage | Length (in) | Width (in) | Thickness (in) |
| --- | --- | --- | --- |
| 80 | about 0.95 | 0.047 | 0.030 |
| 120 | about 1.10 | 0.047 | 0.030 |
| 140 | about 1.25 | 0.047 | 0.030 |

The processing of the ceramic component (i.e., green body processing and sintering conditions) and the preparation of the igniter from the densified ceramic can be done by any conventional method. Typically, such methods are carried out in substantial accordance with the Washburn patent. It has been found that higher sintering temperatures (i.e., above about 1800° C.) tend to produce more grain growth in the aluminum nitride component of the igniter, resulting in a more isolated conductive component and therefore higher resistivity. However, it has been found that raising the sintering temperature above about 1820° C. results in more igniter-to-igniter variability and lower fracture toughness.

The key advantages of the igniter of the present invention are that it possesses a higher resistivity than the conventional small igniters and a moderate NTCR. It is believed that the moderate tendency towards temperature increase produced by the moderate NTCR of these igniters is comfortably balanced by the moderate tendency toward temperature decrease due to radiative heat loss, thereby leading to a self-controlling, temperature stable, high voltage igniter. In 120 V embodiments, it has been found to be very insensitive to process variations, i.e., it is robust. Its hot zone resistance can be designed to be between about 100 and 300 ohms. Other properties of the 120 V igniter of the present invention are comparable to those of the conventional 24 volt igniter. For example, the igniters of the present invention have a power load per unit area of radiating surface of between about 25 and about 35 Watts/cm$^2$, a power consumption of between about 65–85 watts; a room temperature flexure strength of between about 400 and 500 MPa; and a resistivity of at least about 0.2 ohm-cm. In 240 V applications, the less extreme NTCR allows it to more stably operate within a high voltage regime and still attain the performance requirements of conventional igniters. Both the 120 V and 240 V embodiments achieve the performance criteria discussed above.

As with all ceramic igniters, however, some of the selected compositions of the present invention appear to be limited in their ranges of operation. For example, it has been found that in some igniters of the present invention having a hot zone resistivity of at least about 1.1 ohm-cm and a single leg length less than about 1.22 in, instability appears at 1600° C. Further, it has also been found that when the igniters of the present invention reach about 1620° C., their protective native oxide coating melts and failure ensues.

The practice of the present invention can be further appreciated from the following non-limiting Examples and Comparative Examples. For the purposes of the present invention, a "stable" igniter is one which maintains a constant resistivity and a constant temperature at a given voltage.

EXAMPLE 1

A hot zone composition comprising about 60 parts by volume AlN, about 11 parts by volume $MoSi_2$, about 25 parts by volume SiC, and about 4 parts by volume $Al_2O_3$ were blended in a high shear mixer. A cold-zone composition comprising about 20 parts by volume AlN, about 20 parts by volume $MoSi_2$, and about 60 parts by volume SiC were similarly blended. These powder blends were then loaded into adjoining volumes of a hot press and hot pressed to form a billet of about 60% of theoretical density. This billet was then green machined in order to form two-zone tiles that were approximately 3.00×2.00×0.20". Next, the machined tiles were subjected to hot isostatic pressing in which the tiles were soaked at 1790° C. and 30,000 psi for 1 hour. After hipping, the dense tile was diamond machined to a hairpin design igniter (i.e., 1.5" single leg length ×0.030" thickness ×0.047" leg width with a 0,060" slot width.

This igniter displayed good performance at 120 V. It had a sufficiently high resistivity (0.3±0.05 ohm-cm at 1300° C.), a low time-to-temperature (4 seconds to 1100° C.), and was stable up to 132 V.

EXAMPLE 2

Igniters were prepared in a similar manner to that described in Example 1, except that the composition was 60 v/o AlN, 10 v/o $MoSi_2$ and 25 v/o SiC and 5 v/o alumina (Sumitomo AKP-30).

This igniter displayed good performance at 230 V. It had a sufficiently high resistivity (1.2 ohm-cm at 1300° C.), a low time-to-temperature (5 seconds to 1100° C.), and was stable up to 250 V.

EXAMPLE 3

Tiles prepared according to Comparative Example 2 were exposed to water with a temperature of 95° C. for 20 minutes. After drying these tiles showed a weight gain of about 1% resulting from hydrolysis of the AlN which formed alumina upon heating to about 900° C. The tiles were then densified and igniters formed as described in Example 1.

This igniter displayed good performance at 150 V. It had a sufficient resistivity (0.4 ohm-cm at 1300° C.), a low time to temperature (less than 5 seconds to 1100° C.), and was stable up to about 180 V.

Comparative Example 1

Igniters were prepared in a similar manner to that described in Example 1, except that the composition was 66–71 v/o AlN, 8.5–9 v/o $MoSi_2$ and 20.5–25 v/o SiC. There was no alumina used in this composition.

In a 120 V application, this igniter possessed a moderate time to temperature (6–7 seconds to 1100° C).

Comparative Example 2

Igniters were prepared in a similar manner to that described in Example 4, except that the tiles were densified at a soak temperature of 1815° C.

In a 230 V application, this igniter was not only slow (10 seconds to 1100° C.), it was also unstable at 245 V.

Comparative Example 3

Igniters were prepared in a similar manner to that described in Example 1, except that the composition was 65 v/o AlN, 10 v/o $MoSi_2$ and 25 v/o SiC. There was no alumina used in this composition.

In a 120 V application, this igniter was found to have a resistivity of only about 0.1 ohm-cm, reaching 1300° C. at only about 90 V. It possessed this low resistivity even though it had less $MoSi_2$ than Example 1 and the same $MoSi_2$ concentration as Example 2.

The igniters of the present invention may be used in many applications, including gas phase fuel ignition applications such as furnaces and cooking appliances, baseboard heaters, boilers and stove tops.

What is claimed is:

1. A sintered ceramic having a hot zone composition comprising:
   (a) between 50 and 80 vol % of an electrically insulating material consisting essentially of aluminum nitride;
   (b) between 10 and 45 vol % of a semiconductive material selected from the group consisting of boron carbide and silicon carbide, and mixtures thereof;
   (c) between 5 and 25 vol % of a metallic conductor selected from the group consisting of molybdenum disilicide, tungsten disilicide and titanium nitride, and mixtures thereof; and
   (d) between 0.5 and 20 vol % of a resistivity enhancing compound selected from the group consisting of aluminum oxide, aluminum oxynitride, and mixtures thereof, and having an average grain size of between about 2 and 10 microns.

2. The ceramic of claim 1 wherein the aluminum nitride comprises between 50 and 70 vol % of the hot zone composition.

3. The ceramic of claim 2 wherein the semiconductive material comprises silicon carbide.

4. The ceramic of claim 3 wherein the silicon carbide comprises between 20 and 30 vol % of the hot zone composition.

5. The ceramic of claim 3 wherein the metallic conductor is molybdenum disilicide.

6. The ceramic of claim 5 wherein the molybdenum disilicide comprises between 6 and 12 vol % of the hot zone composition.

7. The ceramic of claim 6 wherein the resistivity enhancing compound comprises between 2 vol % and 8 vol % of the hot zone composition.

8. A sintered ceramic having a hot zone composition comprising:
   (a) between 50 and 80 vol % of an electrically insulating material consisting essentially of aluminum nitride;
   (b) between 10 and 45 vol % of a semiconductive material selected from the group consisting of boron carbide and silicon carbide, and mixtures thereof;
   (c) between 5 and 25 vol % of a metallic conductor selected from the group consisting of molybdenum disilicide, tungsten disilicide and titanium nitride, and mixtures thereof; and
   (d) between 2 and 8 vol % of a resistivity enhancing compound selected from the group consisting of aluminum oxide, aluminum oxynitride, and mixtures thereof.

9. The ceramic of claim 8 wherein the aluminum nitride comprises between 50 and 70 vol % of the hot zone composition.

10. The ceramic of claim 9 wherein the semiconductive material comprises silicon carbide.

11. The ceramic of claim 10 wherein the silicon carbide comprises between 20 and 30 vol % of the hot zone composition.

12. The ceramic of claim 10 wherein the metallic conductor is molybdenum disilicide.

13. The ceramic of claim 11 wherein the molybdenum disilicide comprises between 6 and 12 vol % of the hot zone composition.

14. The ceramic of claim 2 wherein the resistivity enhancing compound comprises about 4 vol % of the hot zone composition.

15. The ceramic of claim 8 wherein the resistivity enhancing compound comprises about 4 vol % of the hot zone composition.

* * * * *